(12) United States Patent
Nacken et al.

(10) Patent No.: US 7,981,274 B2
(45) Date of Patent: Jul. 19, 2011

(54) CATALYTIC ELEMENT

(75) Inventors: Manfred Nacken, Heilbronn (DE);
Steffen Heidenreich, Stimpfach (DE)

(73) Assignee: Pall Corporation, Port Washington, NY (US)

( * ) Notice: Subject to any disclaimer, the term of this patent is extended or adjusted under 35 U.S.C. 154(b) by 282 days.

(21) Appl. No.: 12/176,498

(22) Filed: Jul. 21, 2008

(65) Prior Publication Data
US 2009/0019770 A1    Jan. 22, 2009

Related U.S. Application Data

(60) Provisional application No. 60/950,907, filed on Jul. 20, 2007, now abandoned.

(51) Int. Cl.
| C10G 35/06 | (2006.01) |
| C10L 3/00 | (2006.01) |
| B01J 8/00 | (2006.01) |
| B01J 23/00 | (2006.01) |
| B01J 21/00 | (2006.01) |
| B01J 20/00 | (2006.01) |
| B01D 50/00 | (2006.01) |
| B01D 53/34 | (2006.01) |

(52) U.S. Cl. ...... 208/137; 208/138; 48/127.7; 48/127.9; 422/177; 502/252; 502/257; 502/258; 502/259; 502/260; 502/261; 502/262; 502/303; 502/304; 502/319; 502/326; 502/327; 502/328; 502/332; 502/333; 502/334; 502/335; 502/336; 502/337; 502/338; 502/339; 502/340; 502/341; 502/349; 502/350; 502/351; 502/355; 502/415; 502/439; 502/527.19

(58) Field of Classification Search .................. 502/252, 502/303, 304, 319, 325, 337, 338, 339, 340, 502/341, 344, 439, 527.19, 257, 258, 259, 502/260, 261, 262, 326, 327, 328, 332, 333, 502/334, 335, 336, 349, 350, 351, 355, 415; 422/177; 48/127.7, 127.9; 208/137, 138
See application file for complete search history.

(56) References Cited

U.S. PATENT DOCUMENTS

| 3,090,094 | A |   | 5/1963  | Schwartzwalder et al. |
| 3,254,966 | A | * | 6/1966  | Bloch et al. ................... 422/171 |
| 3,840,471 | A | * | 10/1974 | Acres et al. .................... 502/177 |
| 3,912,658 | A | * | 10/1975 | Kaneko et al. ................. 502/251 |
| 4,068,021 | A | * | 1/1978  | Allman .......................... 427/116 |
| 4,280,926 | A | * | 7/1981  | Abe et al. ...................... 502/159 |
| 4,451,441 | A | * | 5/1984  | Ernest et al. ................. 423/213.2 |

(Continued)

FOREIGN PATENT DOCUMENTS
WO    WO 01/60515    8/2001
(Continued)

OTHER PUBLICATIONS

Simell, Pekka A. et al., *Fuel*, 76(12):1117-1127 (1997).
(Continued)

*Primary Examiner* — Cam N Nguyen
(74) *Attorney, Agent, or Firm* — Leydig, Voit & Mayer, Ltd.

(57) ABSTRACT

A catalytic element useful for promoting catalytic gas phase reactions is provided, comprising a porous ceramic body comprising a multiplicity of open pores having a coating comprising a basic oxide material and a catalyst material selected from transition metal and noble metal compounds.

30 Claims, 5 Drawing Sheets

U.S. PATENT DOCUMENTS

| | | | | |
|---|---|---|---|---|
| 4,707,341 A * | 11/1987 | Koch et al. | | 422/171 |
| 4,732,879 A * | 3/1988 | Kalinowski et al. | | 502/5 |
| 4,774,217 A * | 9/1988 | Takeuchi et al. | | 502/178 |
| 4,849,399 A * | 7/1989 | Joy et al. | | 502/333 |
| 5,057,482 A * | 10/1991 | Fukuda et al. | | 502/303 |
| 5,217,939 A * | 6/1993 | Campbell | | 502/339 |
| 5,242,882 A * | 9/1993 | Campbell | | 502/325 |
| 5,334,570 A * | 8/1994 | Beauseigneur et al. | | 502/304 |
| 5,552,360 A * | 9/1996 | Farrauto et al. | | 502/178 |
| 5,629,067 A * | 5/1997 | Kotani et al. | | 428/116 |
| 5,985,220 A * | 11/1999 | Hughes | | 422/177 |
| 7,189,375 B2 * | 3/2007 | Molinier et al. | | 422/171 |
| 7,304,013 B2 * | 12/2007 | Addiego et al. | | 502/300 |
| 7,465,690 B2 * | 12/2008 | Yan | | 502/325 |
| 7,504,359 B2 * | 3/2009 | Ogyu et al. | | 502/439 |
| 7,601,671 B2 * | 10/2009 | LaBarge | | 502/326 |
| 7,660,458 B1 * | 2/2010 | Saric | | 382/154 |
| 7,678,347 B2 * | 3/2010 | Chen | | 422/180 |
| 7,732,366 B2 * | 6/2010 | Ohno et al. | | 502/200 |
| 2004/0087443 A1 * | 5/2004 | Tamura | | 502/439 |
| 2007/0129245 A1 * | 6/2007 | Minami et al. | | 502/302 |
| 2007/0254804 A1 * | 11/2007 | Daniel Doni et al. | | 502/300 |
| 2009/0005240 A1 * | 1/2009 | Noguchi et al. | | 502/251 |

FOREIGN PATENT DOCUMENTS

WO    WO 2006/037387    4/2006

OTHER PUBLICATIONS

Engelen, Karen et al., *Chemical Engineering Science*, 58:665-670 (2003).

Tomishige, Keiichi et al., *Catalysis Communications*, 6:37-40 (2005).

Furusawa, Takesh, et al., *Applied Catalysis A: General*, 278:207-212 (2005).

Ma, L. et al. *Catalysis Today*, 105:729-734 (2006).

Miyazawa, Tomohisa et al., *Catalysis Today*, 115:254-262 (2006).

* cited by examiner

CATALYTIC ELEMENT

CROSS-REFERENCE TO RELATED APPLICATIONS

This patent application claims the benefit of U.S. Provisional Patent Application No. 60/950,907, filed Jul. 20, 2007 (abandoned), which is incorporated by reference.

BACKGROUND OF THE INVENTION

The present invention relates to a catalytic element comprising a porous ceramic body useful for promoting catalytic gas phase reactions in general and for reforming hydrocarbon or tar compounds containing feed gas in particular.

Catalytic elements of the afore-mentioned type are often used in catalytic gas phase reactions where the catalytic elements are operated under severe operating conditions, especially high temperatures like 700° C. or above, high fluid flow rates and quite often a substantial load of particulate contaminants within the gaseous fluid to be treated.

A catalytically active porous element for promoting catalytic gas phase reactions with a specific focus on $NO_X$ reduction is disclosed in WO 2006/037387 A1. The porous body of such catalytically active porous elements comprises a porous structural element of sintered ceramic or metallic primary particles which are selected from fibers and/or granular particles, a secondary structure of titanium dioxide nanoparticles deposited on the surface of said sintered primary particles and a catalytic component deposited on the surface of the titanium dioxide nanoparticles. Although these elements give excellent results in $NO_X$ reduction and a number of other catalytic gas phase reactions, they do not support reforming reactions of hydrocarbons or tar compounds in feed gases like syngas or crude natural gas.

Another type of a porous ceramic body with an open-celled structure for catalytic elements has been suggested in U.S. Pat. No. 3,090,094. Some of the ceramic bodies described in this patent were tested as catalyzer for the oxidation of unburned hydrocarbons in vehicle engine exhaust gas.

These ceramic bodies may not successfully be used for other types of catalytic gas phase reactions, in particular for reforming of tar compounds or hydrocarbons in a feed gas.

Therefore, the object of the present invention is to provide a catalytic element comprising a porous body which may be used in a broad variety of catalytic gas phase reactions, especially under severe operating conditions.

BRIEF SUMMARY OF THE INVENTION

The present invention provides a catalytic element comprising a porous ceramic body comprising a multiplicity of open pores having a coating comprising a basic oxide material and a catalyst material selected from transition metal and noble metal compounds.

Surprisingly, it has been found out that the use of a basic oxide material in combination with the catalyst material deposited within the open pores of the porous body give rise to a catalytic activity of the catalytic element which may be used in a variety of applications, especially in applications with severe operating conditions like high temperatures, i.e., 700° C. and above, high flow velocities, substantial hydrogen sulfide concentrations and last, but not least substantial contaminations of particulate matters in the feed gas.

The catalytic elements of the present invention are especially useful for reforming and hydro-cracking reactions to deplete tar and hydrocarbon compounds from a feed gas.

The reforming reactions may be performed as dry, steam or autothermal reforming processes. The feed gas may be a syngas the quality of which will be improved by the reforming reaction. Especially the gas content of CO and $H_2$ is increased.

Such types of catalytic elements are especially useful in the treatment of gaseous fluids originating from biomass gasification and biomass pyrolysis reactors.

Due to the high temperature stability of the catalytic elements of the present invention, they may be even positioned within the reactor housing of a biomass gasification/pyrolysis reactor. In such applications the catalytic elements often are provided with a filter layer on the upstream surface of the catalytic element in order to provide a filtering effect and remove particulate matter contained in the crude syngas originating from the biomass gasification/pyrolysis reaction.

Typical ceramics for producing the porous ceramic body include silicon carbide, alumina and/or silica.

The size of the pores within the porous body may vary considerably. Typical average pore sizes are in the range from about 50 μm to about 1000 μm.

The basic oxide material used for coating the open pores of the porous ceramic body of the catalytic element preferably includes a basic metal oxide material. Typical examples for such basic oxide materials are MgO, CaO, $K_2O$, $La_2O_3$ and/or $CeO_2$.

Alternatively or additionally, the basic oxide material may comprise mixed oxides. Typical examples of such mixed oxides are MgO—CaO, MgO—$SiO_2$—$Fe_2O_3$, CaO—$Al_2O_3$, MgO—$Al_2O_3$, $CeO_2$—$ZrO_2$, $CeO_2$—$TiO_2$, $La_2O_3$—$TiO_2$ and/or MgO—$Al_2O_3$—$La_2O_3$.

The weight ratios of the constituents of the mixed basic oxides may vary. In case of the mixed oxide CaO—$Al_2O_3$, the weight ratio of CaO:$Al_2O_3$ is preferably about 3:7.

In case of the mixed basic oxides MgO—$Al_2O_3$, CaO—$TiO_2$, $CeO_2$—$ZrO_2$ and CaO—MgO the weight ratio is preferably in the range of from about 1:9 to about 9:1.

In case of the mixed basic oxide MgO—$SiO_2$—$Fe_2O_3$ the weight ratio is preferably in the range of from about 5:4:0.5 to about 5:4:1.5, e.g., 5:4:1, a composition corresponding to the mineral olivine.

The basic oxide material is preferably present in particle form within the pores of the porous ceramic body.

The coating comprising a basic oxide material and a catalyst material provided within the open pores of the porous ceramic body not necessarily needs to be in the form of a continuous coating without any gaps or interruptions, but may be provided in the form of a multiplicity of spot-like areas or islands where the basic oxide material has been deposited on the surfaces of the pores.

Typically, first of all the porous ceramic body of the catalytic element is formed and then the coating is applied to the multiplicity of pores comprising said basic oxide material and catalyst material.

The porous ceramic body of the catalytic element of the present invention may be formed from primary particles which are sintered together to form the porous ceramic body, said primary particles may comprise granular particles and/or fibrous particles.

In the alternative, the porous ceramic body of the catalytic element of the present invention may also be formed from a ceramic foam material having an open-celled porous structure.

Depending on the basic structure of the porous ceramic body of the catalytic element of the present invention, different limits for the amount of basic oxide material are recommended.

In case the porous ceramic body is predominantly made from granular particles which are sintered together, the loading amount of basic oxide material present as a coating within the pores of the porous body preferably amounts to about 5 wt.-% or less, based on the weight of the ceramic body.

In case said ceramic porous body of sintered particles contains a substantial amount of fibrous material, especially ceramic fibers, the amount of basic oxide material which may be used for coating the surfaces of the open pores of the porous body may be present in a loading amount of about 20 wt.-% or less, based on the weight of the ceramic body.

In case the porous ceramic body is constituted of open-celled ceramic foam, the amount of basic oxide material should preferably be limited to about 20 wt.-% or less, based on the weight of the ceramic body.

The above limits avoid an undue loading of the open pores of the porous ceramic body with basic oxide material which otherwise could be detrimental for the flow characteristics and increase the pressure drop excessively.

The selection between the ceramic foam structure for the porous body or the sintered particle structure depends on the operating conditions under which the catalytic element will be used.

While sintered particle structures provide a higher mechanical stability than ceramic foams, the ceramic foam bodies provide for a higher pore volume and a lower flow resistance.

Porous bodies of primary sintered particles are preferred when the catalytic element is to be provided with a filter layer on the upstream side of the catalytic element. The reason for this is that the filter layer, especially a membrane filter layer, may be easier and more uniformly applied onto a sintered particle structure than on a body of a ceramic foam material.

As has been noted above, the basic oxide material may not necessarily be present as a continuous non-interrupted coating on the surfaces of the open pores, but may be present in particulate form that may have a sort of island structures with blank non-coated portions of the surfaces of the pores in between.

When a basic oxide material is used in particulate form, preferably the average particle size of the particulate basic oxide material is selected in the range of from about 10 nm to about 500 nm. More preferred are average particle sizes of from about 20 nm to about 300 nm.

The catalyst material used according to the present invention, namely transition metal and/or noble metal compounds, is preferably deposited at least on the particulate structure provided by the particulate basic oxide material within the pores of the porous body of the catalytic element.

In case one or more transition metal compounds are used as a catalyst material, such compounds are present in the amount of about 1 wt.-% to about 400 wt.-%, based on the amount of said basic oxide material.

Preferably, the one or more transition metal compounds are present also in a particulate form.

The invention thus may make use of the increased surface area by depositing particulate catalyst material on the surfaces of the pores of the catalytic element coated with particulate basic oxide material.

The particulate transition metal compounds have an average particle size in the range of from about 4 nm to about 100 nm.

Typical catalyst materials selected from transition metal compounds are NiO, $CO_3O_4$, $Fe_2O_3$ and $Cr_2O_3$.

NiO is a widely used catalyst compound according to the present invention which may preferably be used alone in an amount of 1 wt.-% to about 400 wt.-%, based on the basic oxide material, or in combination with a further transition metal compound, selected from $CO_3O_4$, $Fe_2O_3$ or $Cr_2O_3$. The latter components of the catalytic material may also be present in a wide range, preferably of from about 1 wt.-% to about 400 wt.-%, based on the weight of the basic oxide material.

Further preferred catalyst materials based on transition metal compounds include in combination NiO, $CO_3O_4$ and $Fe_3O_4$. Another preferred catalyst material comprises in combination NiO, $CO_3O_4$ and $Cr_2O_3$.

In case the catalyst material comprises one or more noble metal compounds, they are present in a total amount of from 0.001 wt.-% to about 100 wt.-%, based on the amount of said basic oxide material.

Again, said one or more noble metal compounds may be present in particulate form, especially deposited on the particulate structure provided by the basic oxide material deposited in particulate form on the surfaces of the pores of the porous body of the catalytic element.

Preferably, the average particle size of the noble metal compounds is in the range of from about 2 nm to about 50 nm which makes optimum use of the large surface area provided by the basic particulate structure of the basic oxide material deposited on the surfaces of the open pores for depositing of the catalyst material.

Typical noble metal compounds, which may be used alone or in combination with one another, include $RuO_2$, $ReO_2$, $Rh_2O_3$ and/or $PtO_2$.

Preferable catalytic elements according to the present invention have a BET surface in the range of from about 0.1 to about 10 $m^2/g$, measured after a thermal treatment at 900° C. for 300 min.

One of several important applications of the catalytic element of the present invention is its use as a tar and/or hydrocarbon compounds removing element.

The catalytic elements of the present invention are of specific advantage as a reforming element for a feed gas comprising tar and/or hydrocarbon compounds.

Since this type of feed gas often results from biomass gasification or biomass pyrolysis, it may also include a substantial load of particulate contaminants like ashes which is preferably filtered from the syngas prior to contacting the same with the catalyst. For such applications, the inventive catalytic element preferably comprises on its upstream side a filter layer. Such catalytic element may be used as a combined filtering element and catalytic element.

The filter layer provided on the upstream side of the catalytic element typically has a pore size of about 10 μm or less.

Furthermore, the present invention relates to a process for removing tar and/or hydrocarbon compounds from gaseous fluids wherein said gaseous fluid is brought into contact with a catalytic element according to the present invention as described above.

The inventive catalytic element may be used in processes where the gaseous fluid comprises water vapour.

The present invention furthermore encompasses a process wherein said gaseous fluid comprises ammonia which is decomposed into nitrogen and hydrogen by way of the inventive catalytic element.

In the inventive process, the catalytic element is preferably maintained at an operating temperature of from about 700° C. to about 900° C. This temperature range gives optimum results for the catalytic process within the element. A typical operating temperature is about 800° C.

Preferably the process making use of the inventive catalytic element may be carried out as an autothermal process where part of the syngas in combusted to provide for the energy needed to maintain the catalytic element at the optimum operating temperature.

Typical examples of the gaseous fluid which may be processed according to the present invention are syngas, crude natural gas or other gases containing methane as main component.

DETAILED DESCRIPTION OF THE INVENTION

Figure 1:
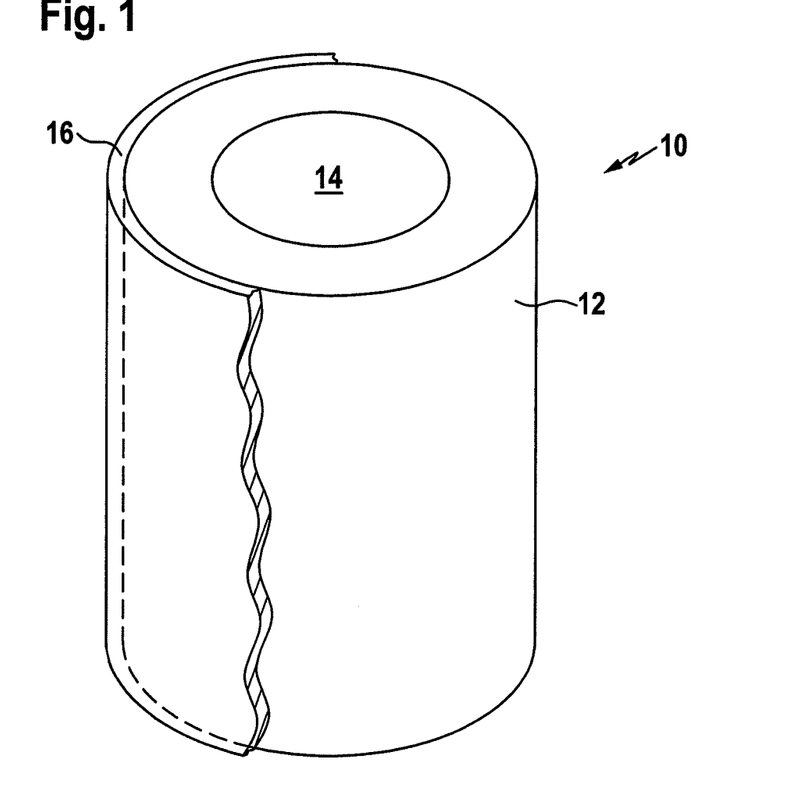
FIG. 1 shows a schematic representation of an inventive catalytic element.

FIG. 1 shows an inventive catalytic element 10 comprising a porous ceramic body 12 with a multiplicity of open pores which may be constituted by sintered ceramic particles or a foamed open-celled ceramic structure.

In FIG. 1, the catalytic element is in the form of a hollow cylinder with an interior central space 14 and a filter membrane 16 provided as a coating of the body 12 on the outer circumference of the hollow cylindrical porous ceramic body.

Although FIG. 1 shows the inventive catalytic element in the form of a hollow cylinder, it is apparent from the aforegoing description that the catalytic element of the present invention may have any geometrical shape including flat sheet structures, corrugated structures and the like.

Figure 2:
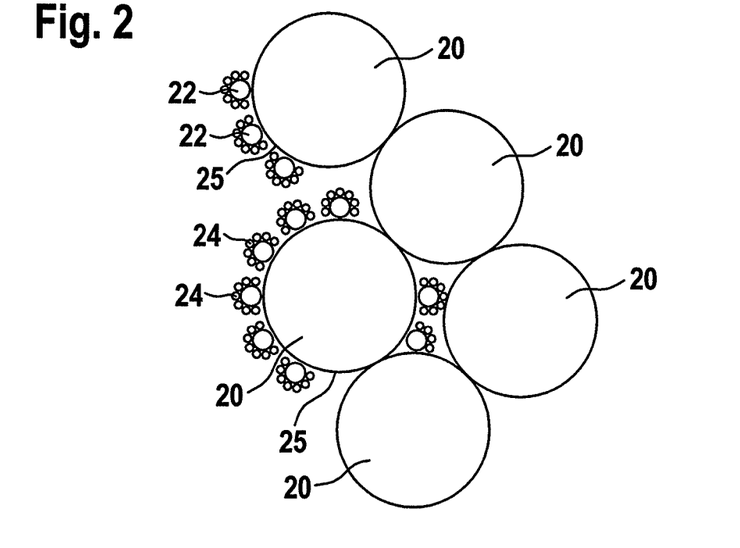
FIG. 2 shows a schematic representation of a micro-structure of a preferred inventive catalytic element.

FIG. 2 shows a schematic representation of a micro-structure of a porous body of an inventive catalytic element. In this case, the micro-structure is composed of ceramic granular particles 20 which are contacting one another on their outer circumferential surfaces. Although FIG. 2 shows the sintered particles as granular particles, it is understood from the aforegoing description of the present invention that the ceramic particles may also be in the form of fibers or a mixture of fibers and granular particles may be used.

In the open pores provided by the sintered ceramic particles 20, a basic oxide material in particulate form is deposited (particles 22) which may be regularly or irregularly deposited on the surfaces of the open pores of the porous ceramic body of the inventive catalytic element.

In addition, the coating of the pores of the inventive catalytic element shown in FIG. 2 comprises a catalyst material in the form of a particulate matter 24 which may be preferably deposited on the basic oxide material particles 22 and optionally also on blank surfaces 25 of the sintered ceramic particles 20.

The catalyst material may be produced in-situ after applying precursor compounds to the surfaces of the open pores of the ceramic body and the basic material deposited therein.

The precursor compounds are preferably water soluble compounds which may be converted in-situ to the catalytically active species.

Figure 3:
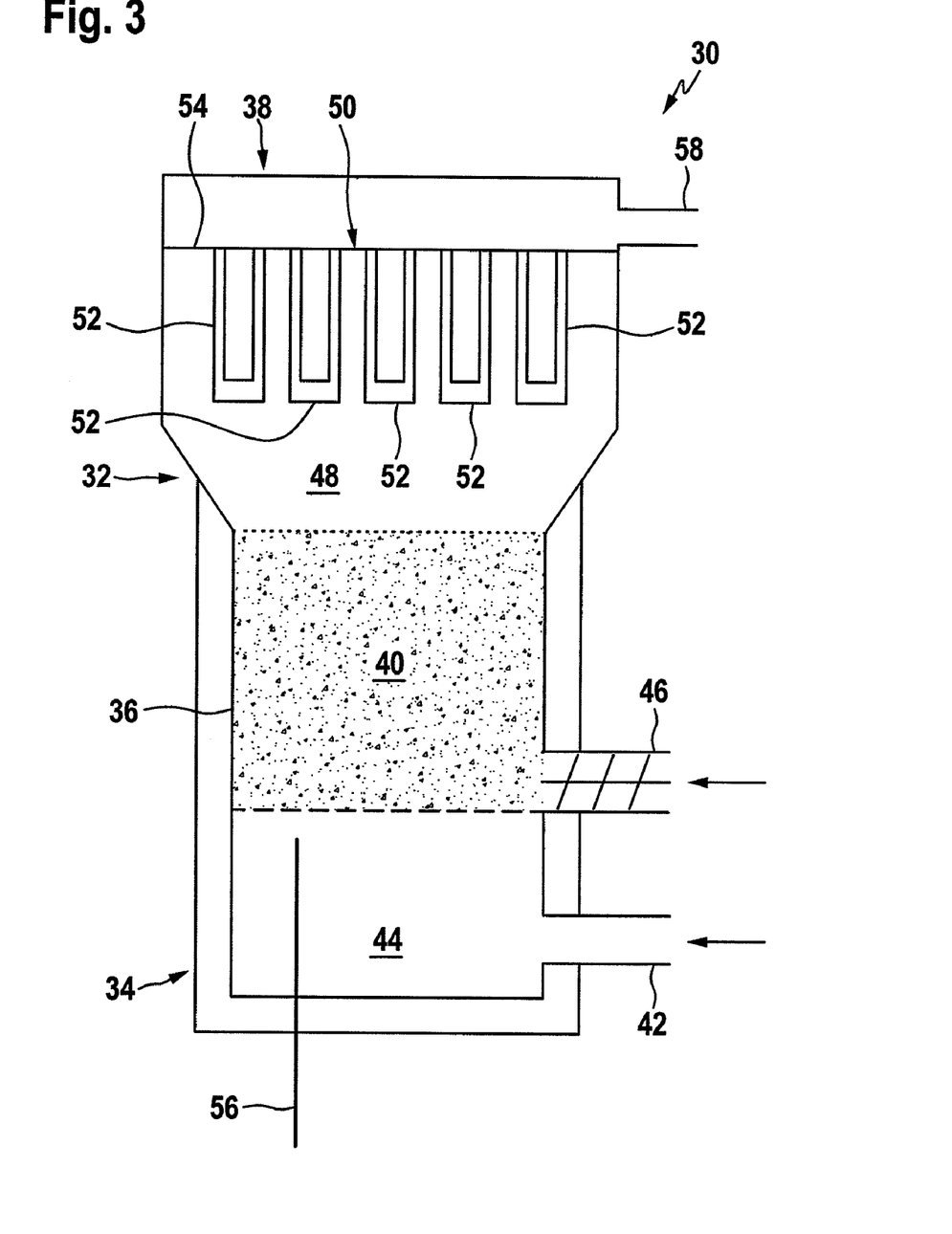
FIG. 3 shows a biomass gasification reactor comprising inventive catalytic elements.

FIG. 3 represents a gasification apparatus 30 making use of catalytic elements according to the present invention.

The gasification apparatus 30 comprises a vessel 32 having a bottom portion 34, a side wall 36 and an upper end portion 38. The vessel 32 accommodates within its side wall 36 a gasifying reactor 40.

In this embodiment the gasifying reactor 40 is of the fluidized bed reactor type.

The bottom portion 34 includes an inlet 42 for a gasifying medium and a plenum 44 for distribution of the gasifying medium over the whole cross section of vessel 32.

The vessel 32 further comprises an inlet 46 for a gasifiable feedstock material, said inlet being in fluid communication with the reactor 40.

The upper end portion 38 of vessel 32 provides a freeboard 48 which accommodates a filtering unit 50 comprising a plurality of inventive catalytic elements 52 mounted in a separation plate 54 which divides the freeboard 48 into a section upstream of the filtering unit 50 which is in direct fluid communication with the downstream end of the reactor 40 and a section downstream of the filtering unit 50 which is in direct fluid communication with a syngas outlet 58 of the vessel 32.

During operation of the gasifying apparatus 30, feed stock material is supplied via inlet 46 which may be equipped with a screw type conveyor into the reactor 40.

Via inlet 42 a gasifying medium is supplied to sustain the gasification reaction in reactor 40.

Syngas created in reactor 40 is collected in freeboard 48 and is directed through the catalytic elements 52 of the present invention prior to withdrawing the same via outlet 58 as purified syngas from the gasification device.

Exhausted feed stock material may be withdrawn from vessel 32 via outlet line 56.

In the configuration shown in FIG. 3, the catalytic elements 52 preferably have a filter membrane deposited on their upstream surface, i.e., their outer circumferential surface in order to remove particulate matter from the crude syngas.

Since the inventive catalytic elements may be placed within the freeboard 48 of the gasification device 30, it is usually not necessary to separately heat the catalytic elements in order to maintain them at an optimum operating temperature. Especially, tar components contained in the crude syngas withdrawn from reactor 40 are still in a vaporized state and will not lead to a blockage of the filter membranes on the outer circumferential surface of the catalytic elements 52 but the tar components may enter through the membrane of the porous ceramic body of the catalytic elements and come into contact with the coating of the open pores therein. In the catalytic elements, a reforming reaction takes place which transforms the tar components and hydrocarbon compounds into more valuable syngas components. Therefore, a refined pure syngas may be withdrawn from outlet 58 of the gasification apparatus 30 which may be directly used as energy source.

Figure 4:
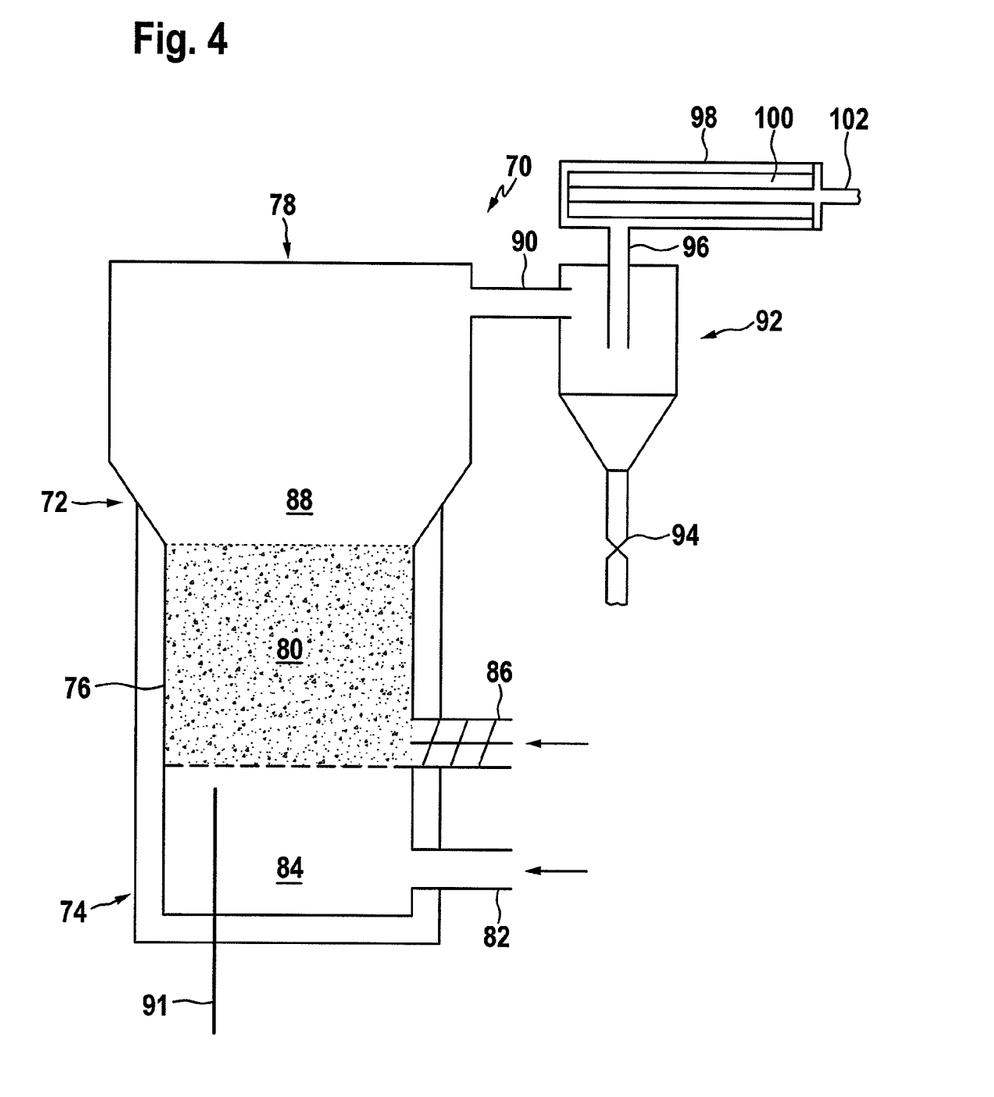
FIG. 4 shows a schematic representation of a biomass gasification apparatus in an alternative design to the design of the reactor of FIG. 3.

The catalytic element of the present invention may also be used in conventional gasification apparatuses like the gasification apparatus schematically shown in FIG. 4. FIG. 4 shows a gasification apparatus 70 comprising a vessel 72 having a bottom portion 74, a side wall 76 and an upper end portion 78. The vessel 72 accommodates within its side wall 76 a gasification reactor 80. The gasification reactor 80 is of the fluidized bed reactor type.

The bottom portion 74 includes an inlet 82 for a gasifying medium and a plenum 84 for distribution of the gasifying medium over the whole cross-section of vessel 72.

The vessel further comprises an inlet 86 for a gasifiable feed stock material, especially a biomass, said inlet being in fluid communication with the reactor 80. The upper end portion 78 of vessel 72 provides a freeboard 88 where the crude syngas from reactor 80 is collected and then directed to a syngas outlet 90.

The gasification apparatus 70 furthermore includes a centrifuge or cyclone 92 which receives the crude syngas via outlet 90 from the freeboard 88 of the gasification apparatus 70. In the cyclone 92 particulate matter contained in the crude syngas is separated from the gaseous components of the syngas. The separated particulate matter is withdrawn from the cyclone 92 via outlet 94. The particulate depleted syngas leaves the cyclone 92 via outlet 96 and enters a housing 98 which accommodates a catalytic element 100 according to the present invention. The catalytic element 100 of the gasification apparatus 70 may have or not have a filtering membrane on its outer circumferential surface, depending on the degree of separation and depletion of particulate matter from the crude syngas achieved in cyclone 92.

In a number of cases, a catalytic element 100 may be used which does not have a filtering layer on its outer circumferential surface.

Once the solids depleted syngas has been passed through the catalytic element 100 it exits the housing 98 via outlet 102 and is ready to be used as an energy source.

Since the catalytic element 100 is positioned outside of the freeboard 88 of the gasification apparatus 70, it may be necessary in addition to provide a thermal insulation of housing 98 and/or to heat the catalytic element 100 in order to maintain an optimum operating condition of the same.

In a number of applications variants of the apparatus described in connection with FIG. 4 may be used which do not comprise a cyclone for particle removal. Such an apparatus will be explained with reference to FIG. 5.

Figure 5:
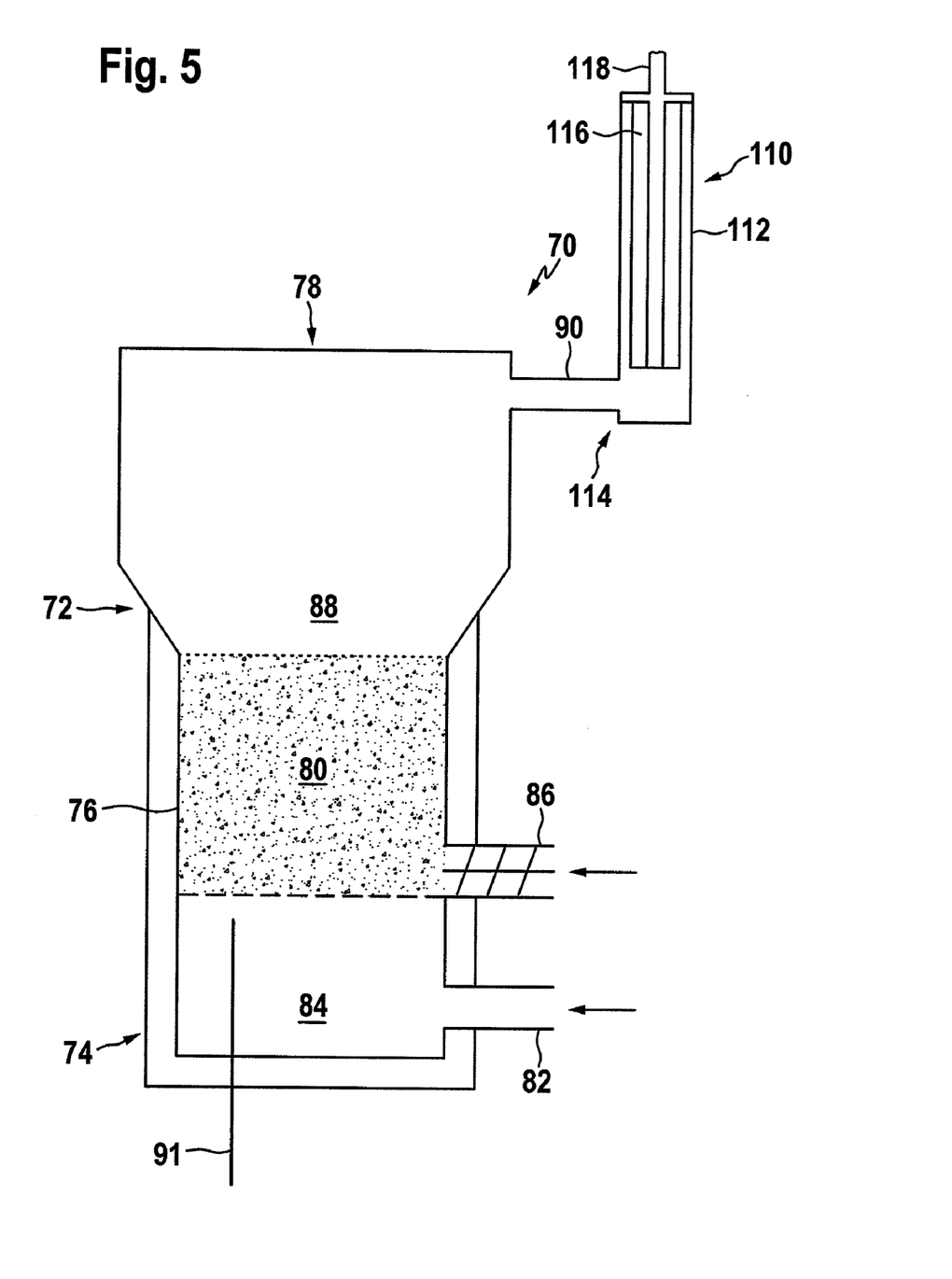
FIG. 5 shows a schematic representation of a biomass gasification apparatus in an alternative design to the design of FIGS. 3 and 4.

FIG. 5 shows a gasification apparatus 70 of identical construction with the apparatus 70 of FIG. 4. Therefore reference is made to the corresponding description of FIG. 4. For identical parts identical reference numerals have been used.

As has been explained in connection with FIG. 4 crude syngas received from reactor 80 is collected in the freeboard 88 and withdrawn from vessel 72 via outlet line 90.

In the embodiment of FIG. 5 the crude syngas is fed via outlet line 90 directly into a filtration apparatus 110 comprising a housing 112 and a crude syngas inlet 114.

The housing 112 accommodates one or more catalytic elements 116 which have on their outer circumferential surfaces a filtering layer. The catalytic elements 116 therefore serve at the same time for separating particulate matter from the crude syngas and for reforming the same. Solids depleted and purified syngas of improved quality is withdrawn from housing 112 via syngas outlet 118.

In the following Examples, manufacturing of and typical applications for exemplary inventive catalytic elements will be described:

EXAMPLE 1

Manufacture of a Catalytic Element

The porous ceramic bodies, used for manufacturing of inventive catalytic element 10 were of a hollow cylindrical shape and had an outer diameter of 60 mm, an inner diameter of 40 mm and a length of 50 mm.

The porous ceramic bodies consisted of sintered SiC grains of two different primary particle sizes. The average sizes of the SiC grains were about 250 μm and about 150 μm, respectively. The average pore size of the ceramic body was approximately 50 μm.

The outer surface of the cylindrical structure used as upstream surface was provided with a membrane filter layer 16. The filter layer 16 had a thickness of approximately 200 μm on average and consisted of sintered mullite particles of an average particle size of about 40 μm. The pore size of the filter layer 16 was approximately 10 μm.

Such porous bodies 12 with membrane filter layers 16 are commercially available as DIA-SCHUMALITH 10-20 from Pall Filtersystems GmbH Werk Schumacher Crailsheim.

The catalytic elements of the present invention were manufactured as follows:

In a first step the membrane filter layer 16 was provided with a protective layer of commercially available paraffin wax with a melting point in the range of 51 to 53° C. The paraffin wax was used in liquid form for impregnating and coating the membrane filter layer 16. Care was taken to ensure that the upstream surface of the membrane filter layer 16 was completely covered by the paraffin wax and the filter layer 16 itself was penetrated by the paraffin wax to an extent of at least 50% of the average thickness of the filter layer. Care was also taken to avoid contact of the porous ceramic body 12 with the paraffin wax.

Figure 6:
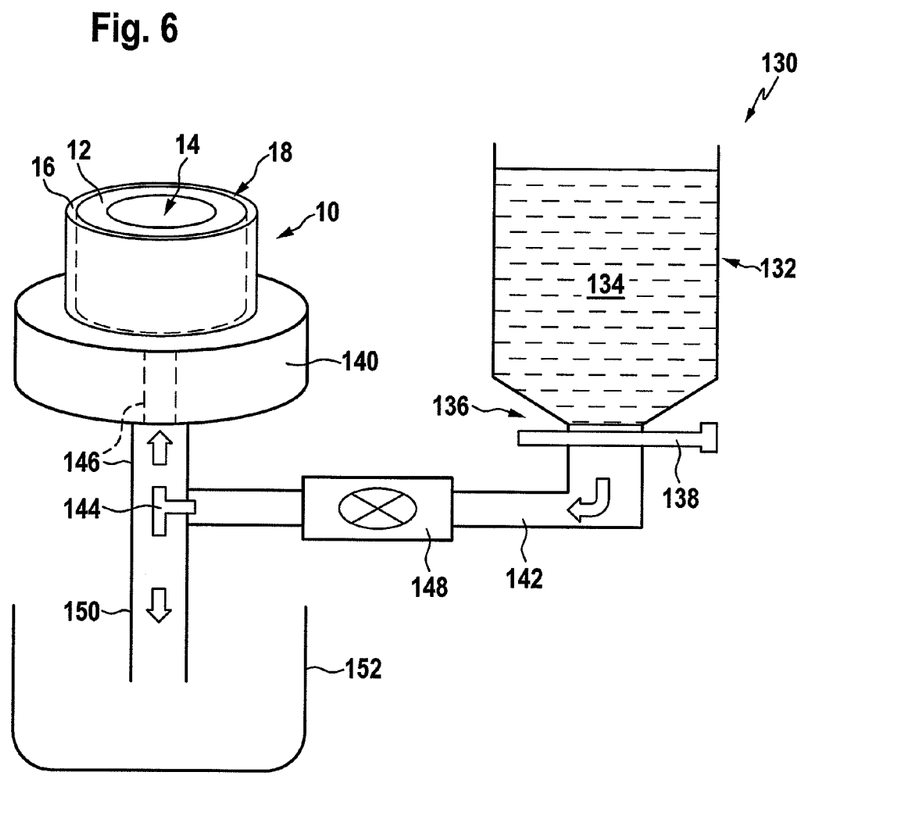
FIG. 6 shows a schematic representation of an apparatus for providing a porous body with a coating according to the present invention.

For providing the pores of the porous body 12 with a coating comprising a basic oxide material and a catalytic material a device 130 was used as schematically shown in FIG. 6. The device 130 comprises a container 132 for holding a coating suspension or solution (liquid 134) to be used for impregnating, i.e. coating the surface of the pores of porous body 12. The liquid 134 may be withdrawn from the container 132 via a bottom outlet 136 including valve 138. The bottom outlet 136 is connected with a rubber hopper 140 via conduit 142, a three-way valve 144 and an upright positioned tube 146. The conduit 142 includes a pump 148 to feed liquid 134 to the tube 146 and the rubber hopper 140.

The rubber hopper 140 serves to receive one end of the element 10 as shown in FIG. 6. Once the element 10 has been properly placed on rubber hopper 140, the three-way valve 144 is set to connect conduit 142 and tube 146. Valve 138 is opened and pump 148 is operated to feed liquid 134 through conduit 142, three-way valve 144 and tube 146 to the rubber hopper 140 and into the interior space 14 of the element 10 until the level of liquid 134 rises up to the upper (open) end 18 of element 10.

The liquid 134 is held within the interior 14 of element 10 for a certain period of time to allow liquid 134 to penetrate into all of the voids volume of the porous body 12 of the element 10. Thereafter, the three-way valve 144 is operated to allow the liquid 134 within the interior 14 of element 10 to be drained via tube 146 and a further tube 150 into a receptacle 152 collecting the used liquid 134.

This sequence will be used for depositing all desired components of the coating, including the precursor liquids of the catalytic compounds.

For the preparation of a $MgO$—$Al_2O_3$ precursor suspension 60 g of commercially available magnesium aluminium hydroxide carbonate containing $MgO$ and $Al_2O_3$ in a mass ratio $MgO:Al_2O_3$ of 70:30 was dispersed in 250 g ethanol by using acetic acid as dispersion additive.

For preparing a stable non-sedimenting suspension the dispersion was milled using a planetary ball mill.

The obtained stable suspension was further diluted with ethanol to adjust it to an MgO—$Al_2O_3$ solids content of 6% by weight and constituted a liquid 134.

The element 10 protected on its upstream (outer) surface by the paraffin protecting layer was mounted with one of its open ends on the rubber hopper 140 to allow the stabilized MgO—$Al_2O_3$ precursor suspension to be pumped through the hopper 140 into the interior 14 of the element 10 for wetting the porous body 12 of sintered primary particles completely with the MgO—$Al_2O_3$ precursor suspension. Thereafter, the suspension was kept for 15 sec in the interior of the element 10. Subsequently, the remaining suspension was drained.

The hereby obtained impregnated element 10 was dried while horizontally rotating the same and using an air stream to obtain a magnesium aluminium hydroxide carbonate coated tubular filter element. The temperature during the drying step was kept constant.

After complete drying the coated element 10 was thermally treated to fix and dehydrate the magnesium aluminium hydroxide carbonate coating and eliminate the protective paraffin wax coating at the same time.

For the protection of the filter membrane during the subsequent catalyst deposition a paraffin wax coating for the membrane layer 16 was provided as described above.

For the catalytic activation of the paraffin wax protected and magnesium aluminium hydroxide carbonate coated filter element 10 an aqueous impregnation solution containing 56 g nickel nitrate hexahydrate dissolved in 180 g deionized water was used as liquid 134. The impregnation was performed in the same manner as in case of the impregnation with the magnesium aluminium hydroxide carbonate suspension. After a holding time of 15 sec the remaining impregnation solution was drained from the interior 14 of the completely wetted element 10. In contrast to the drying procedure of the magnesium aluminium hydroxide carbonate impregnation step, the tubular 10 element was only partially dried to a mass loss of 35% by weight with respect to the initial mass of loaded catalyst impregnation solution.

After this drying procedure the sample was directly thermally treated by heating up the tubular element 10 to 900° C., holding it at 900° C. for 300 min in air and cooling it down to room temperature in an electrically heated kiln to obtain a catalytic filter element with a MgO—$Al_2O_3$ loading of 0.9% by weight based on the weight of the porous body. The average particle size of the deposited MgO—$Al_2O_3$ primary particles was approximately 100 nm.

The NiO loading in this catalytic filter was about 120% by weight, based on the weight of the basic mixed oxide MgO—$Al_2O_3$. The average particle size of the NiO primary particles was about 50 nm.

The BET surface amounted to 0.7 $m^2/g$.

The thus obtained catalytic filter element 10 showed a differential pressure of 22.5 mbar at 25° C. at a face velocity of 90 m/h which is in a typical range for the target applications described above.

EXAMPLE 2

Use of an Inventive Catalytic Element for Tar Removal

A catalytic filter element 10 prepared according to Example 1 was used in this Example The tar removal performance of the catalytic filter element 10 was examined in the temperature range of from 700 to 900° C. using a circular segment cut out from the catalytic filter element 10 and fixed in an alumina tube reactor. A model biomass gasification gas consisting of 50 vol % $N_2$, 12 vol % CO, 10 vol % $H_2$, 11 vol % $CO_2$, 5 vol % $CH_4$ and 12 vol % $H_2O$ was used comprising 5 $g/Nm^3$ naphthalene as tar model compound.

A constant face velocity of 90 m/h was adjusted at all temperature settings, and the naphthalene conversion was measured in the absence and presence of $H_2S$. The absolute preparation and measurement error was at ±10%. The results are reported in Table I.

TABLE I

| Temperature [° C.] | Naphthalene conversion in the absence of $H_2S$ [%] | Naphthalene convention in the presence of 100 ppmV $H_2S$ [%] |
|---|---|---|
| 700 | 83.4 | 6.7 |
| 750 | n.m. | 16.8 |
| 800 | 97.8 | 44.9 |
| 850 | n.m. | 63.5 |
| 900 | 99.4 | 75.2 | n.m. = not measured.

A nearly complete naphthalene conversion of about 98% was found at 800° C. in the absence of $H_2S$ which shows the high tar removal performance of the developed catalytic filter element 10. Deactivation of the catalyst material by $H_2S$ is a known feature of Ni catalysts and can be reduced by modifying the catalyst composition as will be shown in Example 3.

EXAMPLE 3

Use of Another Inventive Catalytic Element for Tar Removal

In this Example a catalytic filter element 10 with a NiO loading of about 60 wt % was used. For depositing the catalyst material on the basic oxide material coated pore surface of a catalytic filter element as prepared in Example 1 a solution of 28 g nickel nitrate hexahydrate in 180 g deionized water was used while all other preparation parameters as described above were observed.

The obtained catalytic filter element 10 was tested under the same conditions as reported in Example 2. An improved naphthalene conversion of 57.8% in the presence of 100 ppmV $H_2S$ at 800° C. in comparison to 44.9% of the catalytic filter element with a NiO loading of 120 wt % (cf. Tab. I and II for comparison) was observed.

TABLE II

| Temperature [° C.] | Naphthalene conversion in the absence of $H_2S$ [%] | Naphthalene convention in the presence of 100 ppmV $H_2S$ [%] |
|---|---|---|
| 700 | 91.6 | 4.7 |
| 750 | n.m. | 22 |
| 800 | 96.8 | 57.8 |
| 850 | n.m. | 78.7 |
| 900 | 99.8 | 89.8 | n.m. = not measured.

The invention claimed is:

1. A catalytic element comprising a porous ceramic body comprising a multiplicity of open pores having a coating comprising a basic oxide material and a catalyst material selected from transition metal and noble metal compounds, wherein the basic oxide material is present in particulate form, and the average particle size of the particulate basic oxide material is in the range of from about 10 nm to about 500 nm.

2. The element of claim 1, wherein said basic oxide material comprises a basic metal oxide material.

3. The element of claim 2, wherein the basic oxide material comprises MgO, CaO, $K_2O$, $La_2O_3$ and/or $CeO_2$.

4. The element of claim 2, wherein said basic metal oxide material comprises mixed oxides.

5. The element of claim 4, wherein said mixed metal oxide is selected from the group consisting of MgO—CaO, MgO—$SiO_2$—$Fe_2O_3$, CaO—$Al_2O_3$, MgO—$Al_2O_3$, $CeO_2$—$ZrO_2$, $CeO_2$—$TiO_2$, $La_2O_3$—$TiO_2$ and MgO—$Al_2O_3$—$La_2O_3$.

6. The element of claim 1, wherein said basic oxide material is regularly distributed on the surface areas of the pores.

7. The element of claim 1, wherein said porous body comprises sintered ceramic primary particles.

8. The element of claim 7, wherein said primary particles comprise granular particles.

9. The element of claim 8, wherein said basic oxide material is present in a loading amount of about 5% by weight or less, based on the weight of the ceramic body.

10. The element of claim 7, wherein said primary particles comprise ceramic fibers.

11. The element of claim 10, wherein said basic oxide material is present in a loading amount of about 20% by weight or less, based on the weight of the ceramic body.

12. The element of claim 1, wherein said porous body is made of a ceramic foam.

13. The element of claim 12, wherein said basic oxide material is present in an amount of about 20% by weight or less, based on the weight of the ceramic body.

14. The element of claim 1, wherein the average particle size of the particulate basic oxide material is in the range of from about 20 nm to about 300 nm.

15. The element of claim 1, wherein said catalyst material comprises one or more transition metal compounds which are present in a total amount of from about 1 to about 400% by weight, based on the amount of said basic oxide material.

16. The element of claim 15, wherein the one or more transition metal compounds are present in particulate form.

17. The element of claim 16, wherein the average particle size of the particulate transition metal compounds is in the range of from about 4 nm to about 100 nm.

18. The element of claim 1, wherein said catalyst material comprises NiO, $Co_3O_4$, $Fe_2O_3$, $Cr_2O_3$, or combinations thereof.

19. The element of claim 1, wherein said catalyst material comprises one or more noble metal compounds which are present in a total amount of from about 0.001 to about 100% by weight, based on the amount of said basic oxide material.

20. The element of claim 1, wherein said catalyst comprises $RuO_2$, $ReO_2$, $Rh_2O_3$ $PtO_2$, or combinations thereof.

21. The element of claim 1, wherein said element has a BET surface in the range of from about 0.1 to about 10 $m^2/g$ after a thermal treatment at 900° C. for 300 min.

22. A process for removing and/or reforming tar and/or hydrocarbon compounds from gaseous fluids, by contacting said gaseous fluid with a catalytic element according to claim 1.

23. The process of claim 22, wherein said gaseous fluid comprises water vapour.

24. The process of claim 22, wherein said gaseous fluid comprises ammonia which is decomposed into nitrogen and hydrogen.

25. The process of claim 22, wherein the element is maintained at an operating temperature of from about 700° C. to about 900° C.

26. The process of claim 22, wherein said gaseous fluid is a syngas.

27. The process of claim 22, wherein said gaseous fluid is crude natural gas.

28. A catalytic element comprising a porous ceramic body comprising a multiplicity of open pores having a coating comprising a basic oxide material and a catalyst material selected from transition metal and noble metal compounds, wherein said element comprises on its upstream side a filter layer.

29. The element of claim 28, wherein said filter layer has a pore size of about 10 μm or less.

30. A catalytic element, comprising a porous ceramic body comprising a multiplicity of open pores having a coating comprising a basic oxide material and a catalyst material selected from transition metal and noble metal compounds, wherein said catalyst material comprises one or more transition metal compounds which are present in a total amount of from about 1 to about 400% by weight, based on the amount of said basic oxide material, wherein the one or more transition metal compounds are present in particulate form, and wherein the average particle size of the particulate transition metal compounds is in the range of from about 4 nm to about 100 nm.

* * * * *